(12) United States Patent
Bird

(10) Patent No.: US 8,348,317 B1
(45) Date of Patent: Jan. 8, 2013

(54) HOLDING APPARATUS

(76) Inventor: Mark C. Bird, Frederick, MD (US)

( * ) Notice: Subject to any disclaimer, the term of this patent is extended or adjusted under 35 U.S.C. 154(b) by 0 days.

(21) Appl. No.: 13/464,961

(22) Filed: May 5, 2012

(51) Int. Cl.
*B65G 7/12* (2006.01)

(52) U.S. Cl. ............. 294/16; 294/118; 294/902; 248/75

(58) Field of Classification Search .................... 294/11, 294/16, 118, 902; 248/75–78
See application file for complete search history.

(56) References Cited

U.S. PATENT DOCUMENTS

| | | | |
|---|---|---|---|
| 297,788 A * | 4/1884 | Green ............................. | 294/16 |
| 735,799 A * | 8/1903 | McGill ........................... | 294/16 |
| 877,012 A * | 1/1908 | Sullivan ......................... | 294/16 |
| 1,058,926 A | 4/1913 | Toole | |
| 1,275,068 A * | 8/1918 | Messiter ........................ | 248/78 |
| 1,405,164 A | 1/1922 | Schein | |
| 1,512,003 A | 10/1924 | McGeary et al. | |
| 1,592,556 A | 7/1926 | Canaan, Jr. | |
| 1,625,255 A * | 4/1927 | Hudgins ......................... | 294/15 |
| 1,829,621 A | 10/1931 | Whiteford | |
| 1,862,053 A | 6/1932 | Grant | |
| 2,692,712 A | 10/1954 | Conley | |
| 2,789,006 A * | 4/1957 | Mattson ........................ | 294/118 |
| 2,884,173 A | 4/1959 | Campbell et al. | |
| 4,063,767 A * | 12/1977 | Hardin .......................... | 294/16 |
| 4,470,177 A | 9/1984 | Ganung et al. | |
| 4,632,443 A | 12/1986 | Miller et al. | |
| 4,838,465 A | 6/1989 | Metzger | |
| 4,856,834 A | 8/1989 | Lancaster et al. | |
| 5,136,757 A | 8/1992 | Labonville | |
| 5,433,288 A | 7/1995 | James | |
| 5,588,689 A * | 12/1996 | Ochs ............................ | 294/118 |
| 5,979,840 A | 11/1999 | Hollister et al. | |
| 6,851,732 B2 | 2/2005 | Fiesler et al. | |
| 7,275,777 B1 | 10/2007 | Urdiales | |
| 7,730,588 B1 | 6/2010 | Bernier | |
| 2010/0086391 A1 | 4/2010 | Padilla | |

* cited by examiner

*Primary Examiner* — Dean Kramer

(57) ABSTRACT

A holding apparatus has: a first sleeve having a first arm and a first handle; a second sleeve having a second arm and a second handle; a coupling element that couples together the first and second sleeves about an axis of rotation, with an overlap between the first and second arms upon sufficient rotation of the second sleeve about the axis of rotation towards a closed position of the holding apparatus; an adjustable receiving structure formed of inwardly oriented receiving surfaces of the first and second arms and configured to receive and retain an object upon sufficient rotation of the second sleeve about the axis of rotation towards the closed position; a quick release mechanism; and an adjustable sizing element configured to be in releasable engagement with the quick release mechanism that releasably maintains an adjustable size of the adjustable receiving structure.

28 Claims, 13 Drawing Sheets

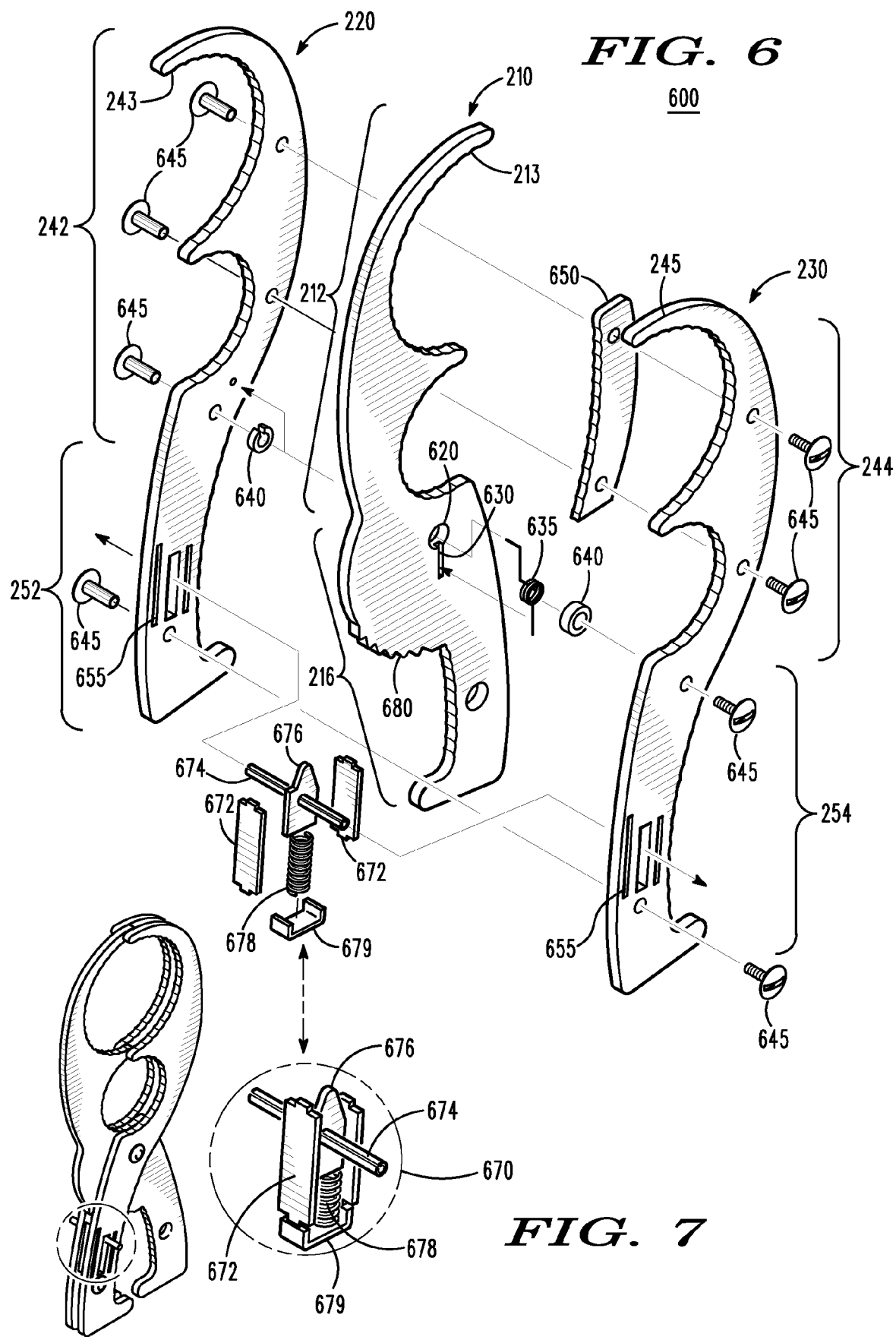

SECTION "A-A"

ALUMINUM

SECTION "B-B"

PLASTIC

SECTION "C-C"

ALUMINUM WITH
PLASTIC COATING

SECTION A "A-A"

ALUMINUM WITH
PLASTIC COATING

HOLDING APPARATUS

BACKGROUND

In the fire service, firefighters are tasked with controlling hoses under pressure in stressful situations. The ability to control hoses, including nozzle reaction and hose back-pressure, in an emergency requires strength and stamina. The operator additionally cannot easily release themselves from the hose lines when necessary. These factors add to the danger, skill and strength required to safely operate fire hoses, thereby adding to the stress inherent in such situations as well as limiting the pool of persons who may safely and competently operate fire hoses.

In addition, there is a need to be able to safely carry hoses, tools and other objects in a variety of industries or applications, including the fire service, residential, commercial, and industrial applications, while still having hands free to perform other tasks as needed.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 6 is an exploded view of a three sleeve holding apparatus, in accordance with various implementations.

FIG. 7 is a view of a quick release mechanism of a holding apparatus, in accordance with various implementations.

Figure 1:
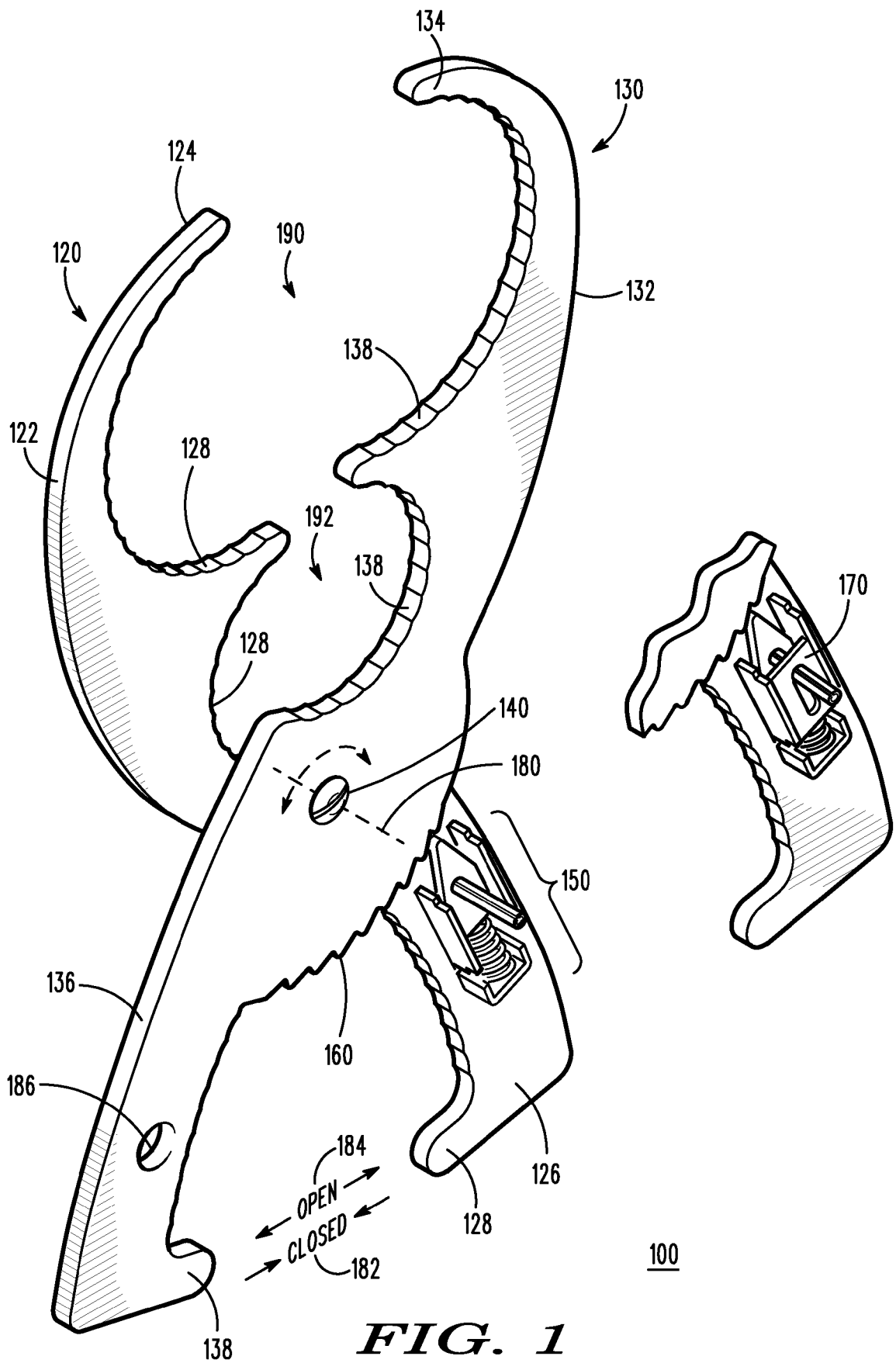
FIG. 1 is an isometric view of a two sleeve holding apparatus, in accordance with various implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A holding apparatus, described in accordance with various implementations, is suitable to carry hoses, tools, or other objects in a manner that reduces fatigue of the user, and thus enhances user safety. One-handed operation of the holding apparatus frees up the user to perform other tasks, provides for on-demand quick release, and also reduces user fatigue. The holding apparatus described herein has many uses, including the improved and easier operation of fire hoses, carrying and securing tools, attachment of personnel to a ladder, and dragging victims from buildings. The user may carry a variety of tools, such as saws, ropes, ladders, pike poles, axes, sledgehammers, etc. while using one or both hands to safely grasp climbing stairs or ladders while climbing. In this sense, the holding apparatus may be used to carry a "Stokes basket" at hip level of the user while keeping hands free for patient care in an emergency care situation. In such a situation, four rescuers may each carry one corner of the Stokes basket using the holding apparatus. Stabilization, fatigue and safety are each enhanced through the use of the holding apparatus.

Applications where the holding apparatus may be of great utilization and benefit, extend far beyond the fire service into industrial, commercial and residential applications. In the commercial and residential building industries, which may include arborists, industrial plants, commercial cleaning, etc. the need to readily, safely, and with one hand or no hands carry tools, air hoses and large tools is appreciated. Battery powered tools may be held at the operator's side in the holding apparatus and swung up and used by the operator as needed, without the need to bend down and pick up needed tools from the ground. In the fire service, firefighters must be able to manage the nozzle reaction and back pressure of a fire hose or hoses, and it can be difficult to disengage quickly from a fire hose when necessary. For example, 1½, 1¾, 2 and 2½ inch hose lines are commonly used in firefighting situations. The holding apparatus described herein provides for a user/operator to hold and control a hose under pressure while also being able to quickly and readily release it when necessary.

Therefore, in accordance with various implementations, a holding apparatus has: a first sleeve having a first arm and a first handle of the holding apparatus; a second sleeve having a second arm and a second handle of the holding apparatus; a coupling element that couples together the first and second sleeves about an axis of rotation of the holding apparatus, with an overlap between the first and second arms of the holding apparatus formed upon sufficient rotation of at least the second sleeve about the axis of rotation towards a closed position of the holding apparatus; an adjustable receiving structure formed of inwardly oriented receiving surfaces of the first and second arms of the holding apparatus and configured to receive and retain an object upon sufficient rotation of at least the second sleeve about the axis of rotation towards the closed position of the holding apparatus; a quick release mechanism coupled to at least one of the first and second handles of the holding apparatus; and an adjustable sizing element coupled to the second handle of the holding apparatus configured to be in releasable engagement with the quick release mechanism to releasably maintain an adjustable size of the adjustable receiving structure, where activation of the quick release mechanism releases engagement of the adjustable sizing element with the quick release mechanism and allows at least the second handle and second arm to rotate about the axis of rotation.

Figure 4:
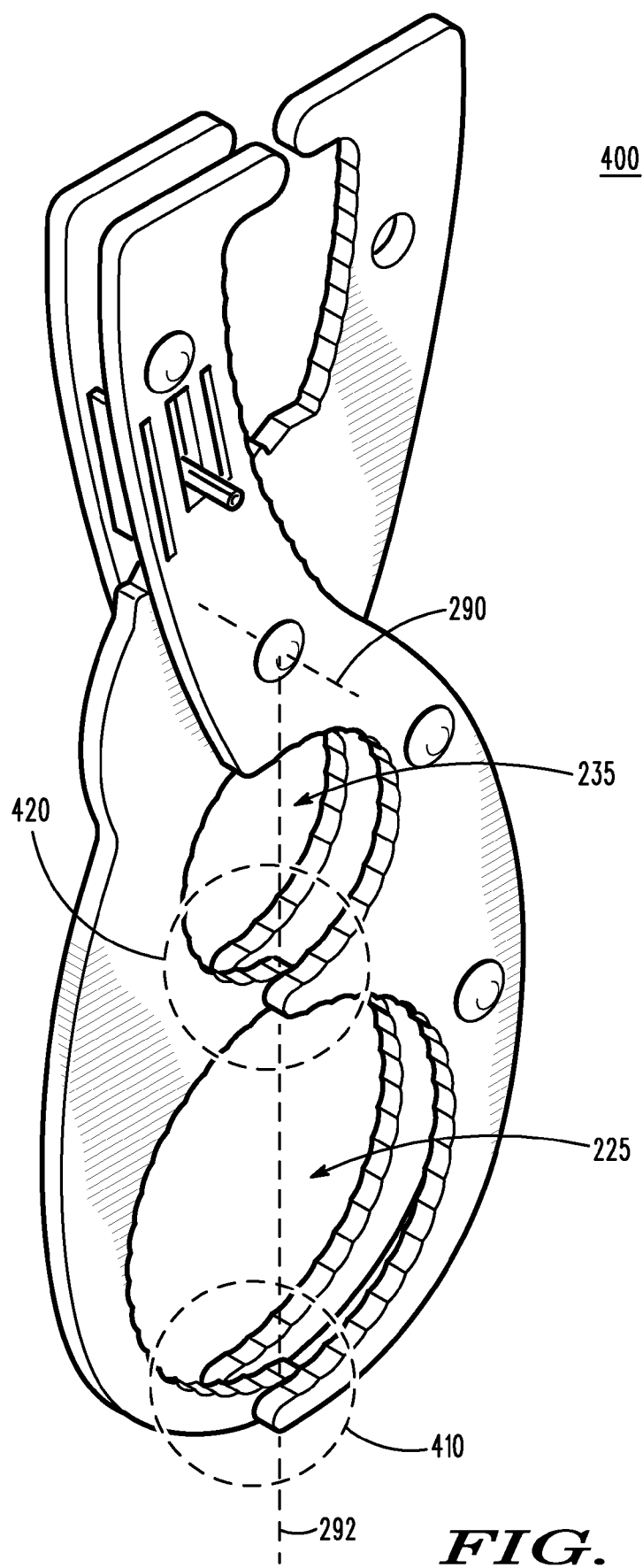
FIG. 4 is an isometric, bottom-up view of a closed three sleeve holding apparatus, in accordance with various implementations.
Figure 5:
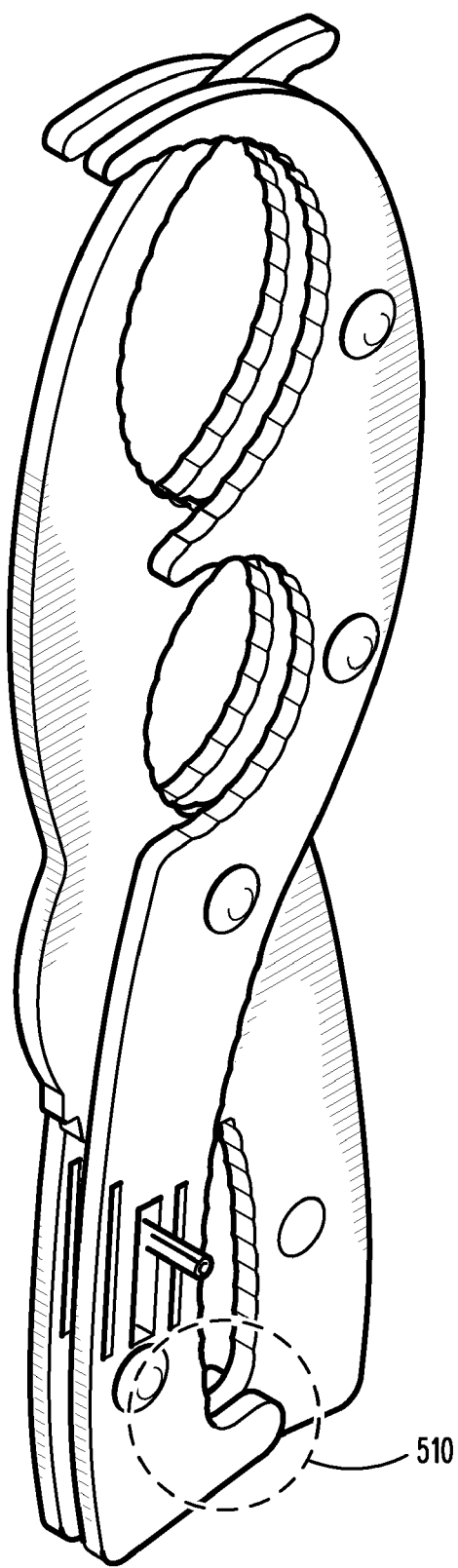
FIG. 5 is an isometric view of closed three sleeve holding apparatus in which overlap and interleaving can be seen, in accordance with various implementations.

Referring now to FIG. 1, in accordance with certain implementations, an isometric view of a holding apparatus 100, such as might be used to hold a fire hose, other type of hose, tools, or other objects, with two sleeve elements 120, 130 is illustrated. First sleeve 120 has an arm 122 with a tip portion 124 and a handle 126. Second sleeve 130 has an arm 132 with a tip portion 134 and a handle 136. A coupling element 140, such as a screw, sexless screw, bolt, or the like, couples together sleeves 120, 130 about an axis of rotation 180 at coupling element 140, with an overlap between arms 122, 132 of the holding apparatus formed upon sufficient rotation of at least one of the sleeves, such as handle 136 and arm 132 of sleeve 130 about axis of rotation 180 towards a closed position, indicated in the drawing, of the holding apparatus, as illustrated in FIGS. 4, 5, and 7 for a three sleeve holding apparatus, for example. Sleeves 120, 130 may be formed of metal, such as ¼, ³⁄₁₆, ⅛ inch thick pieces of aluminum, ⁵⁄₁₆$^{th}$ inch thick plastic, even wood, or other material. Full casted, high impact plastic may be used.

Quick release mechanism 150, shown as a finger pull mechanism in this example and also in the example implementations of FIGS. 2A, 2B, 3-8, 10A, and 11A, is coupled to the handle portion 126 of sleeve 120 as shown and works in tandem with adjustable sizing element 160, shown here as ratchet teeth in this embodiment. Adjustable sizing element 160 coupled to handle 136 of sleeve 130 and coupling element 140 as shown is configured to be in releasable engagement with quick release mechanism 150 to releasably maintain an adjustable size of the adjustable receiving structure 190. The Quick release mechanism may have a plate 170 that covers and protects components of the mechanism is desired. Quick release mechanism 150 is formed to be ergonomically compatible with a person's fingers, so that it can be easily found and used with bulky gloves and in a smoke-filled environment.

Figures 2A, 2B, 2C:
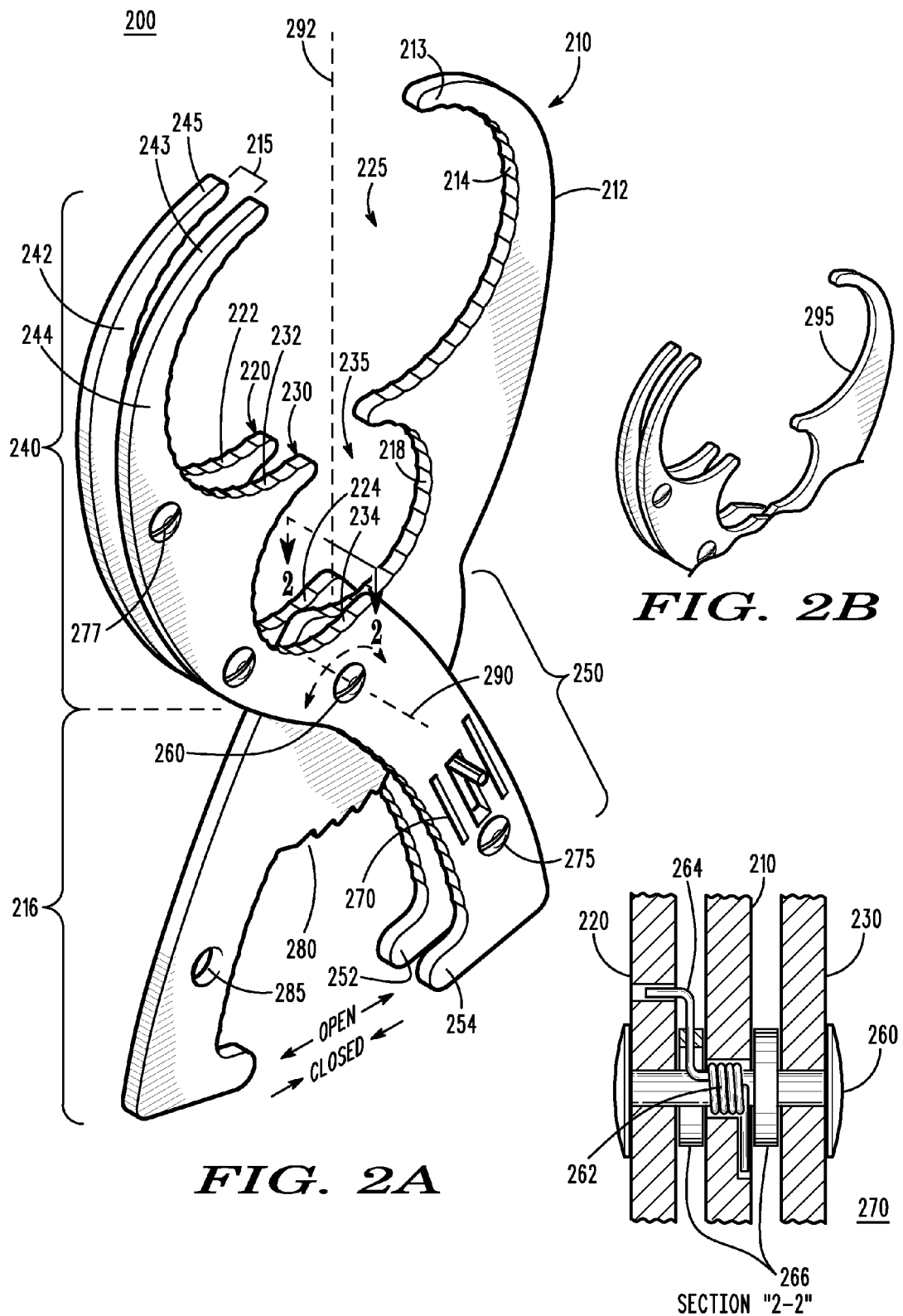
FIG. 2A and FIG. 2B are isometric views of a three sleeve holding apparatus, in accordance with various implementations.
FIG. 2C is a cross-sectional side view of a coupling element of FIG. 2A, in accordance with various implementations.
Figure 10B:
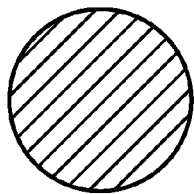
FIGS. 10B, 10C, 10D illustrate cross-sectional views of various materials used to form the tubular, rounded receiving arms of FIG. 10A, in accordance with various implementations.
Figure 10C:
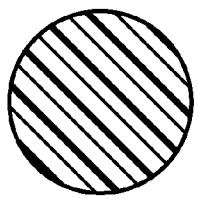
Figure 10D:
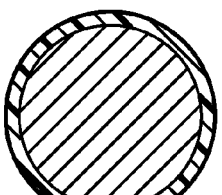
Figure 10A:
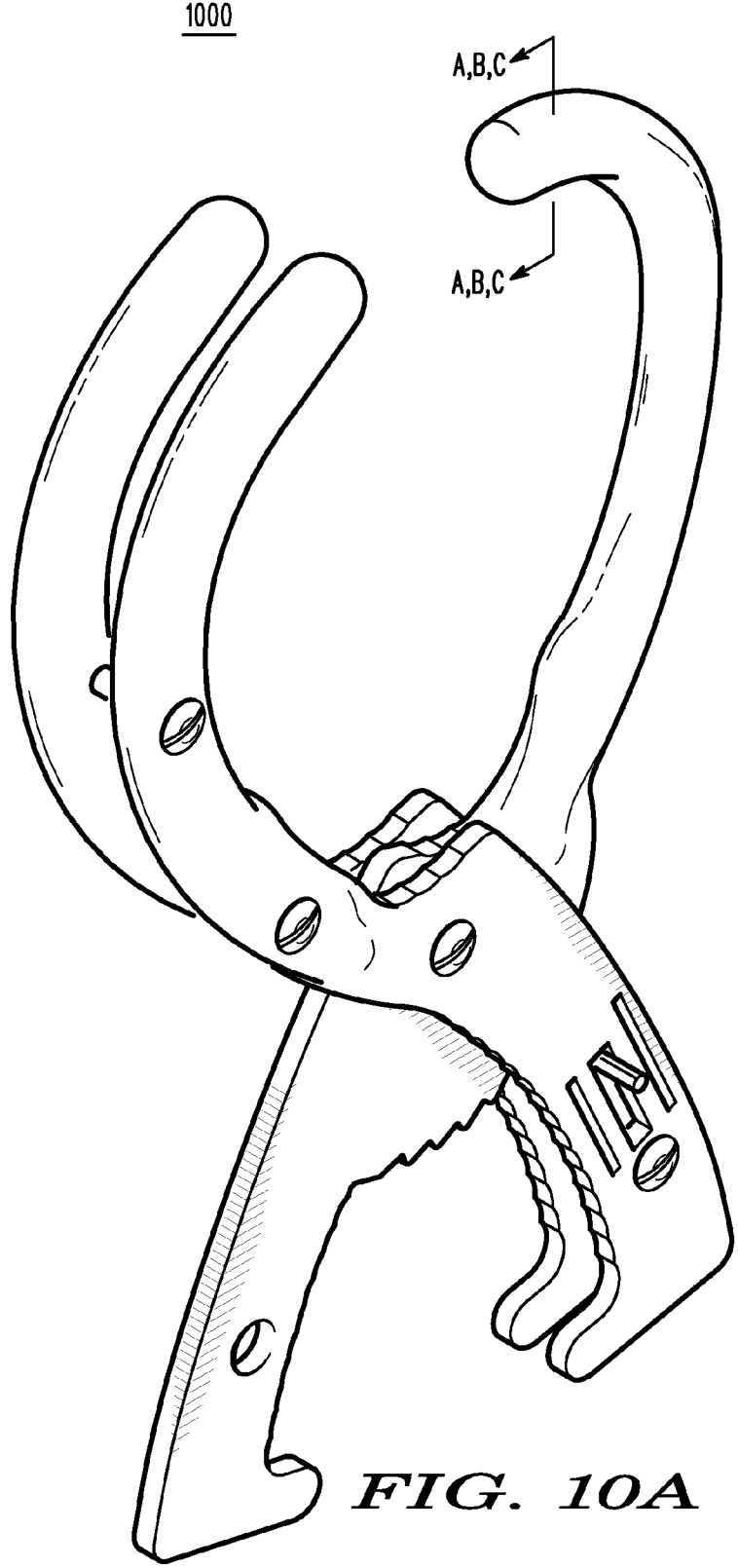
FIG. 10A illustrates a holding apparatus with a single rounded interior receiving structure, in accordance with various implementations.

Adjustable receiving structure 190, 192 of the holding apparatus is formed by inwardly oriented receiving surfaces 128, 138 of the arms 122, 132, respectively, and configured to receive and retain an object or multiple objects within upon sufficient rotation of at least the sleeve 130 about the axis of rotation 180 towards the closed position of the holding apparatus. An adjustable receiving structure may be formed of one pair of mated interior receiving surfaces 128, 138 that are in cooperative arrangement to form a single receiving structure, such as is shown in FIG. 10A, and may be represented by either 190 or 192, for example, or two receiving structures may be formed by two pairs of mated interior receiving surfaces 128, 138 as illustrated by 190 and 192 here. The surface of inwardly oriented receiving surfaces 128, 138 may be textured, such as slightly ridged or ribbed as shown, to enhance gripping ability of the adjustable receiving structure, though this is not required. Reference to FIG. 2B, for example, illustrates a relatively smooth inwardly oriented receiving surface 295. It was found that a textured gripping surface in some circumstances where the water, gas, or other fluid being carried by a hose under pressure may chafe the material of hose or other object being retained by the adjustable receiving structure. In such circumstances, the pressure force exerted by the material in the hose may be adequately controlled by a smooth interior surface that does not scratch the exterior jacket of a hose line.

Figure 12:
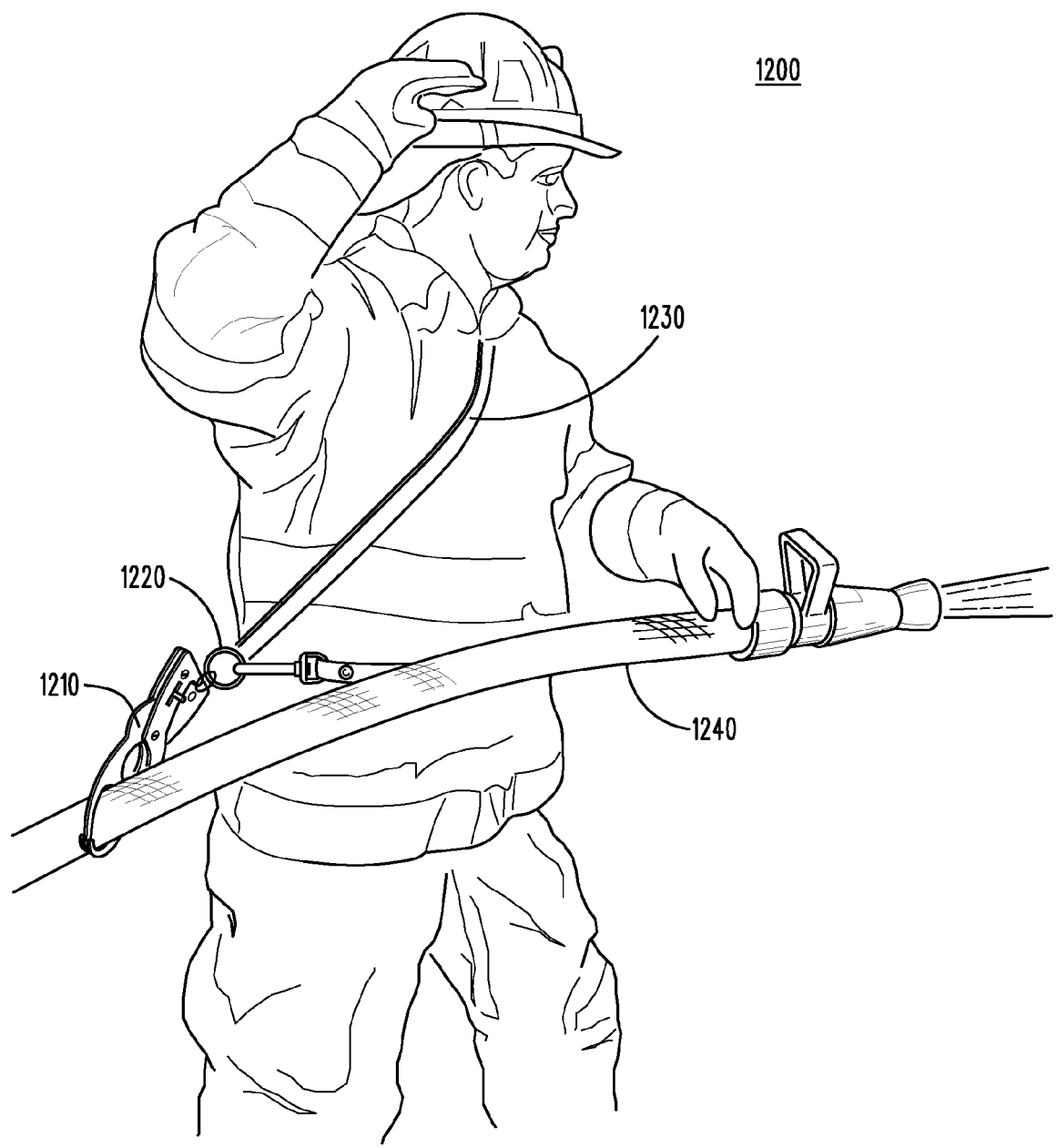
FIGS. 12-14 illustrate ease of operation of the holding apparatus, in accordance with various implementations.
Figure 13:
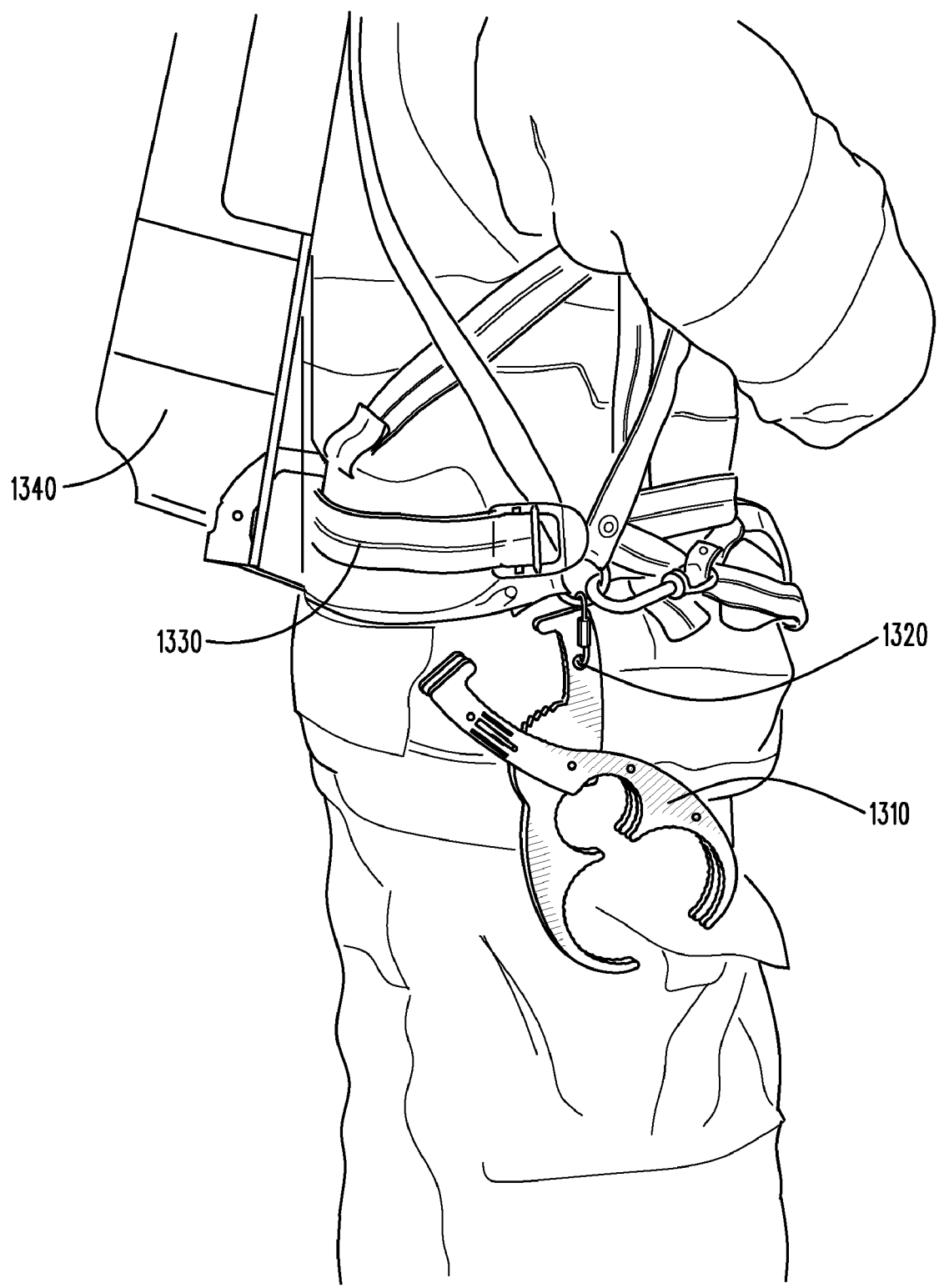
Figure 14:
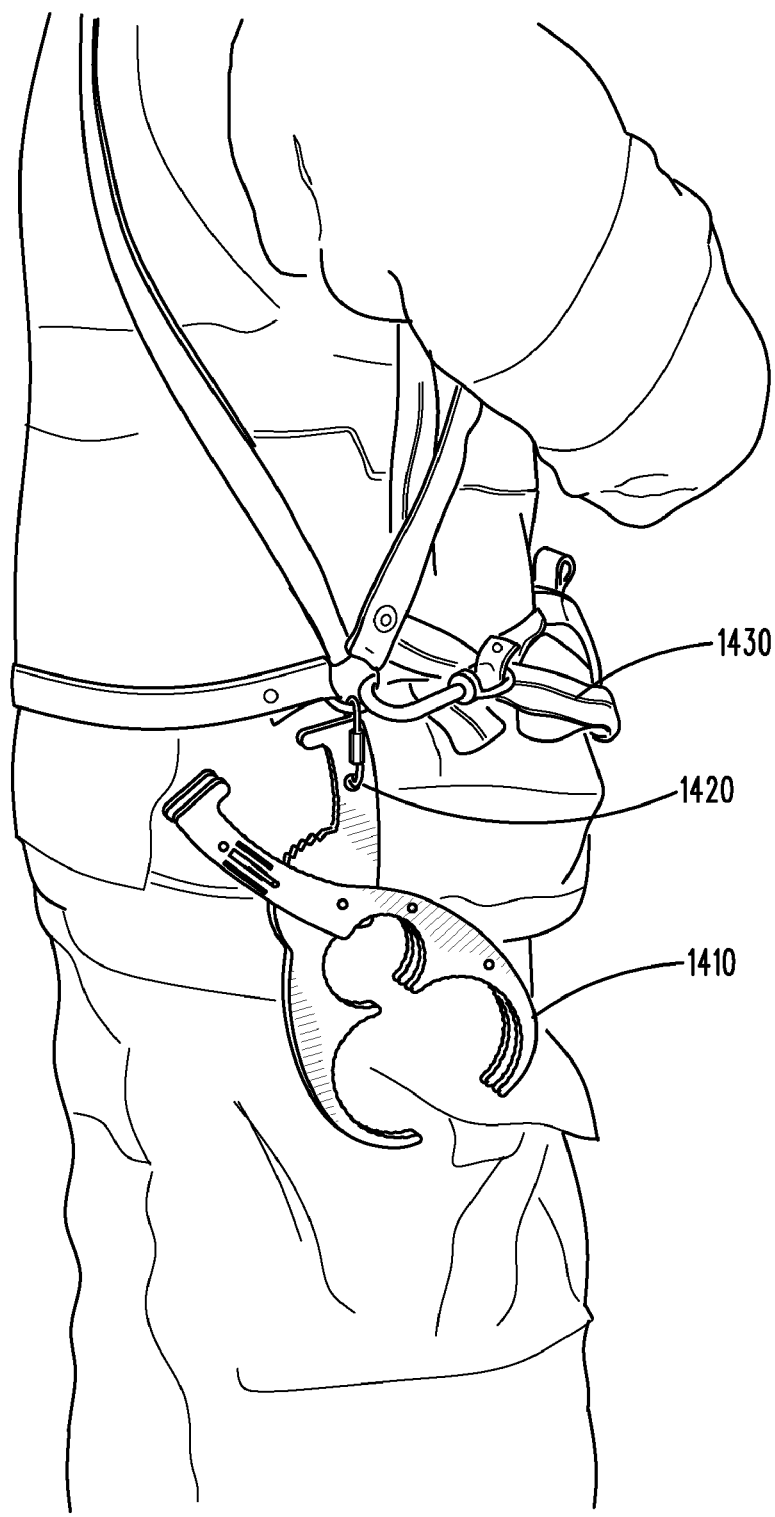

Adjustable receiving structures 190, 192 may be of different dimensions; as shown here, uppermost adjustable receiving structure 190 is larger and able to accommodate larger hoses or other objects than smaller, lowermost adjustable receiving structure 192. The interior receiving surfaces 128, 138 of an adjustable receiving structure may be generally curved as shown in order to conform to the object to be received, such as a tubular hose, for example, and two adjustable receiving structure 190, 192 having generally curved interior receiving surfaces are able to accommodate hoses of different dimensions. Of course, in service, one of the adjustable receiving structures, such as smaller structure 192, may be employed to attach the holding apparatus 100 to a structure, which may be fixed and relatively, like a ladder, scaffolding, tree, stairwell, etc., while the larger adjustable receiving structure 190 may be used to hold hoses, tools, or other objects. Attachment of the holding apparatus to a structure in this manner may be employed while the holding apparatus is being worn by a user, or such attachment may be employed independently of user. Further, a user may wear the holding apparatus by attaching it via attachment hole 186 to a belt or strap. Attachment hole in certain implementations is on the right handle of the holding apparatus as an attachment point for a shoulder and waist strap. This usage of an attachment hole is illustrated in FIGS. 12-14. A belt clip or "D" ring used to attach the holding apparatus to a belt or strap may be rated at 350 pounds or more, for example. Further, the strap may be made up of two individual straps, one for over the user's shoulder, and the other for around the user's waist. The strap(s) material may be, for example, one inch tubular webbing, leather, or fire resisitive material.

Sufficient rotation may be achieved by simultaneously rotation of sleeves 120 and 130 about the axis of rotation 180, and in practice this result from rotation of at least one of the handles, such as handle 136, handle 126, and/or handles 126 and 136 together towards a closed position of the holding apparatus 100, as indicated by reference number 182. Conversely, rotation 184 of at least one of the handles, handle 136, handle 126, and/or handles 126 and 136 together towards an open position of the holding apparatus is achieved by rotation in the opposing direction. It is noted that when the handle and arm of a sleeve are formed of a unitary material, as shown here, that movement 182 of a handle of a sleeve towards a closed position of the apparatus or movement 184 towards an open position of the apparatus in effect moves the arm associates with a moved handle also towards the closed or open positions, respectively. Thus, for example, movement 182 of handle 136 towards the closed position of the apparatus also causes arm 132 to move towards the closed position as well.

Sufficient rotation about rotation axis 180 of at least one of the handles 126, 136 towards the closed position will result in an overlap between the tip portions 124, 134, respectively, of arms 122, 132. Moreover, sufficient rotation towards the closed position will cause an overlap between the bulbous interior portions 128, 138, respectively, of handles 126, 136. Such overlap provides mechanical stability and strength to the holding apparatus. Such handle overlap is illustrated for the three sleeve holding apparatus by handle overlap 510 in the closed isometric view 500 of the holding apparatus in FIG. 5, for example. In the three sleeve implementations described below, the overlapped arrangement may be augmented by an interleaved arrangement between the three sleeves which provides enhanced strength and stability.

Activation of quick release mechanism 150, such as by pulling the finger pull shaft of the finger pull quick release mechanism 150, releases engagement of the adjustable sizing element 160 with the quick release mechanism 150 and allows at least the handle and arm of sleeve 130 to freely rotate about axis of rotation 180. The adjustable receiving structure 190 can be readily and easily resized to any desired dimension by engaging quick release mechanism 150 with adjustable sizing element 160 and rotating about axis 180 until the desired size is achieved. Such resizing and engagement may be accomplished by one-handed operation by the user of the holding apparatus, a tremendous advantage. And, once object(s) are received and retained within the adjustable receiving structure 190, hands-free operation by a user while wearing the holding apparatus may be enjoyed. Moreover, it is noted that hands-free operation while wearing the holding apparatus is available to a user whether or not object(s) are releasable secured within adjustable receiving structure 190.

Figure 9A:
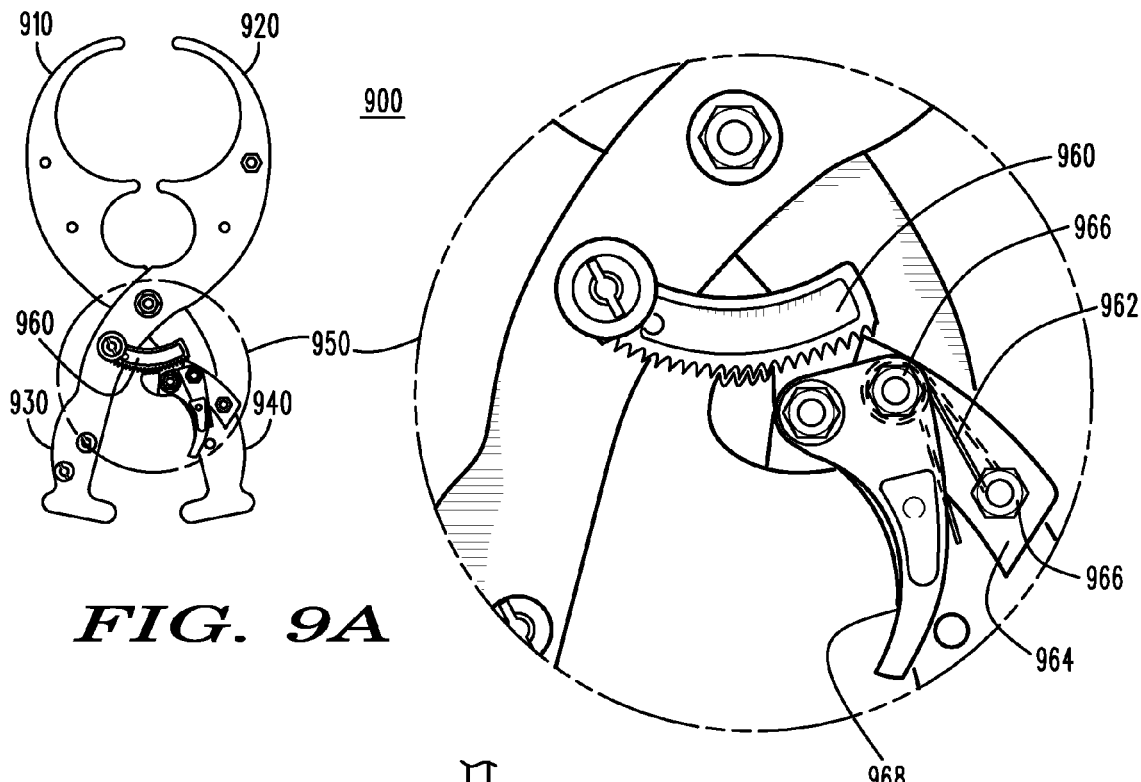
FIG. 9A is a front view of a trigger quick release mechanism, in accordance with various implementations.
Figure 9B:
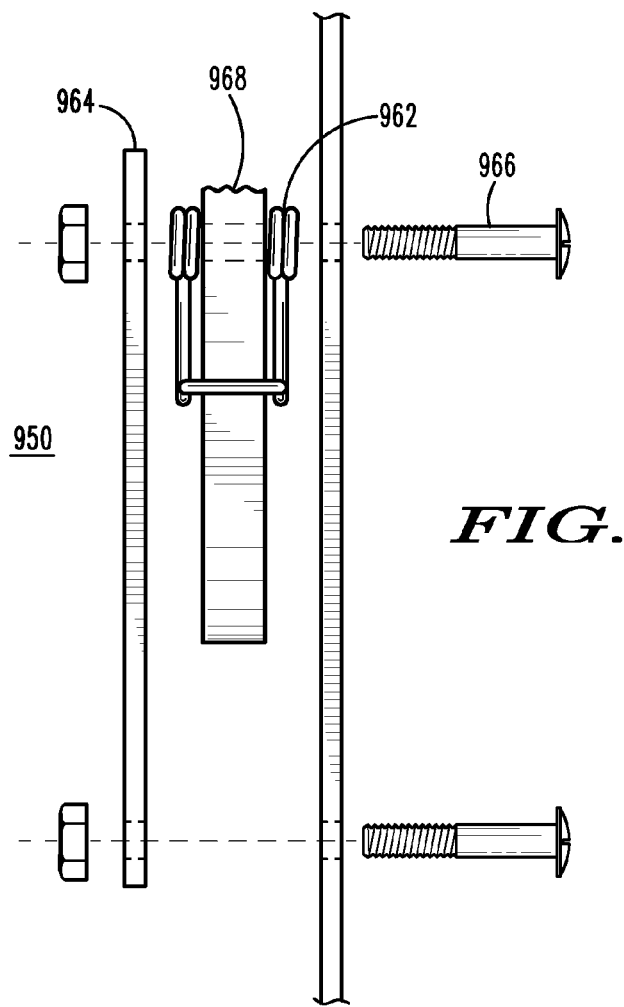
FIG. 9B is a side view of a trigger quick release mechanism, in accordance with various implementations.

Quick release mechanism 150 may also be a trigger release mechanism, such as that shown in FIGS. 9A and 9B, for example. Both trigger and finger pull quick release mechanisms offer the advantage of one-handed operation, freeing up the user of the holding apparatus to do other things if so desired.

Referring now to FIGS. 2-14, certain example implementations envision a three sleeve holding apparatus, which offers enhanced strength and stability. Holding apparatus 200 of FIG. 2A is formed of three sleeves: inner sleeve 210 and outer sleeves 220, 230. Outer sleeves 220, 230 each have an arm portion above coupling element 260 that together form the first arm 240 of the apparatus. Similarly, the handle portions of outer sleeves 220, 230 below coupling element 260 together form the first handle 250 of the apparatus.

In this embodiment, the outer sleeves 220, 230 share a first orientation about the coupling element 260 that is the mirror opposite or reverse that of a second orientation of the inner sleeve 210 with respect to coupling element 260. In other words, in certain embodiments, as in this one, both the arm and handle portions of the outer sleeves are oriented in the same way with respect to coupling element 260, and in fact may be the same or similar in size and configuration; this orientation is opposite that of the inner sleeve. In this configuration, the interior receiving surfaces 222, 232 of outer sleeves 220, 230, respectively, have an opposite orientation that of interior receiving surface 214 of inner sleeve 210 and these interior receiving surfaces together form upper adjustable receiving structure 225. Similarly, interior receiving surfaces 224, 234 of outer sleeves 220, 230, respectively, have an orientation opposite that of interior receiving surface 218 of inner sleeve 210 and these interior receiving surfaces together form lower adjustable receiving structure 235. The one or more adjustable receiving structures 225, 235 are configured to releasably receive one or more objects. Upon sufficient rotation of the handles about the axis of rotation 290 towards the closed position, an intermediate overlap portion of the adjustable receiving structures intermediate a longitudinal axis 292 of the holding apparatus between tip overlap portions 213 and 243, 245 and axis of rotation 290 may result. This is illustrated, for example, as intermediate overlap portion 420 in the closed isometric view 400 of the holding apparatus 200 in FIG. 4. Thus, sufficient rotation of holding apparatus 200 about the axis of rotation 290 forms an intermediate overlap portion 420 of the first and second generally curved adjustable receiving structures 225, 235 intermediate a longitudinal axis 292 of the holding apparatus between a tip overlap portion 410 and the axis of rotation 290. The axis of rotation 290 is fixed with respect to the three sleeves 210, 220, 230.

The interior receiving surfaces of the adjustable receiving structure(s) 225, 235 may be generally curved first interior receiving surfaces 222, 232, 224, 234 of arm 240 and generally curved second interior receiving surfaces 214, 218 of the second arm 212, as shown. As previously described, curved interior receiving surfaces may be particularly suitable for receiving and retaining curved objects, such as hoses. Adjustable receiving structures 225, 235 of different dimensions, as shown in the drawing, allow for differently sized hoses and/or other objects to be received and retained. And, as previously discussed, one of the adjustable receiving structures, such as smaller adjustable receiving structure 235, for example, may be used to attach the holding apparatus to a structure, which may be fixed, such as a stair railing, or movable, such as the ladder of a fire truck.

In the example of FIG. 2A, if the holding apparatus were disassembled, as in FIG. 6, the three sleeves if oriented the same way and stacked one on the other would be substantially similar in configuration and size. This is not to say, however, that there may not be variations in configuration and size of the sleeve elements; such revisions are envisioned. For example, the thickness of inner sleeve 210 may be less than that of outer sleeves 220, 230, which as outer elements of the apparatus may enhance the strength of the apparatus by the contribution of thicker and thus more robust sleeves.

From this description, it can be seen in this implementation that the holding apparatus has first and second outer sleeves 220, 230, with the first outer sleeve having a first outer handle portion 252 and a first outer arm portion 242 and the second outer sleeve having a second outer handle portion 254 and a second outer arm portion 244, the first and second outer handle portions forming the first handle 250 of the holding apparatus and the first and second outer arm portions forming the first arm 240 of the holding apparatus. The holding apparatus further has an inner sleeve 210 having an inner handle portion and an inner arm portion, with the inner handle portion forming the second handle 216 of the holding apparatus and the inner arm portion forming the second arm 212 of the holding apparatus. Inner sleeve 210 further has attachment element hole 285 adapted to attach the holding apparatus to a strap.

Coupling element 260 may be a set screw as shown or other element sufficient to couple together inner sleeve 210 to and in an interleaved arrangement with the first and second outer sleeves 220, 230 about an axis of rotation 290 of the holding apparatus as shown. Outer sleeves 220, 230 are coupled together by handle attachment element 275, which may be a screw, bolt or the like, to form the first handle 250. Similarly, arm attachment element 277, which may also be a screw, bolt or the like, couples together the outer arm portions to form the first arm 240 of holding apparatus 200.

Spacing 215 between the coupled first and second outer sleeves 220, 230 is approximately a thickness of inner sleeve 210 and is sufficient to accommodate receipt of the second arm 212 between the first and second outer arm portions of outer sleeves 220, 230 of the first arm 240 in an interleaved arrangement in which tip portions 243, 245 of first arm 240 and tip portion 213 of second arm 212 overlap and the tip portion 213 is interleaved between tip portions 243, 245 when the first and second handles 216 and 250 are sufficiently rotated towards each other and a closed position of the holding apparatus about the axis of rotation 290. A spacing element, such as a spacer or the like, attached between the first and second outer arm portions by the arm attachment element 277 provides and maintains the spacing between the outer arm portions of first arm 240 of holding apparatus 200. Spacer 650 of FIG. 6 is an illustration of a suitable spacing element. It is noted that the thickness of the spacing element is at least the thickness of second arm 212 of the holding apparatus to accommodate the interleaved arrangement of the second arm 212 of inner sleeve 210 between the first and second outer arm portions of the first arm 240 of holding apparatus 200. For example, spacer 650 may be a ¼ inch piece of aluminum, with the spacing between the first and second arm portions at about 5/16 of an inch, for example.

From this description, it can be seen that the coupling element 260 couples together inner sleeve 210 to the first and second outer sleeves 220, 230 about the axis of rotation 290 of the holding apparatus, with a spacing 215 between the coupled first and second outer sleeves that approximates a thickness of inner sleeve 210 and is sufficient to accommodate receipt of the second arm 212 between the first and second outer arm portions of the first arm 240 in an interleaved arrangement in which the first and second arms overlap when the first and second handles are sufficiently rotated towards each other (towards the closed position) about the axis of rotation 290.

As illustrated in FIG. 2C, coupling element, viewed along section 2-2 of FIG. 2A, may include a screw 260 in cooperative arrangement with a spring element having spring 262 and spring arms 264 seated in a slot of first sleeve 210. Spacers 266, which as washers or the like, may be used to separate outer sleeves 220 and 230 as shown. Reference to FIG. 6 illustrates that coupling element may be formed of a spring element 635 seated in slot 630 of inner sleeve 210. Spacing between the first and second sleeves is maintained by spacers 640 and the coupling element secured by screws 645.

Quick release mechanism 270 of holding apparatus 200 is coupled to at least one of the two handles, in this case handle 250, and is a mechanism configured to quickly disengage from adjustable sizing element 280 and thereby allow rotation of the handles about axis of rotation 290. Rotation of the handles about axis of rotation 290 provides for the user to easily size the adjustable receiving structures 225, 235. Quick release mechanism 270 may be a finger pull assembly, as shown in FIGS. 2A-8, for example, or in some implementations may be a trigger assembly as illustrated in FIGS. 9A and 9B. Either a finger pull assembly or a trigger assembly allows for easy, one-handed operation on the part of a user of the holding apparatus.

Adjustable sizing element 280 of the second handle of the holding apparatus is configured to be in releasable engagement with quick release mechanism 270 to releasably maintain an adjustable size of the adjustable receiving structures 225, 235, where activation of the quick release mechanism 270 releases engagement of the adjustable sizing element 280 with the quick release mechanism and allows the second handle and second arm of inner sleeve 210 to rotate about the axis of rotation 290. For example, in this example implementation, activation of quick release mechanism 270 releases engagement of the quick release mechanism 270 with the adjustable sizing element 280 and permits rotation of the handle and arm of inner sleeve 210 about the axis of rotation 290 towards an open position of the holding apparatus to increase the adjustable size of the adjustable receiving structures 225, 235 of the holding apparatus or towards a closed position of the holding apparatus to decrease the adjustable size of the adjustable receiving structures 225, 235 of the holding apparatus.

Adjustable sizing element 280 as illustrated in this implementation includes ratchet teeth with which the quick release mechanism 270 may engage as handle 216 is rotated about the axis of rotation 290 towards the closed position of the holding apparatus.

Figure 3:
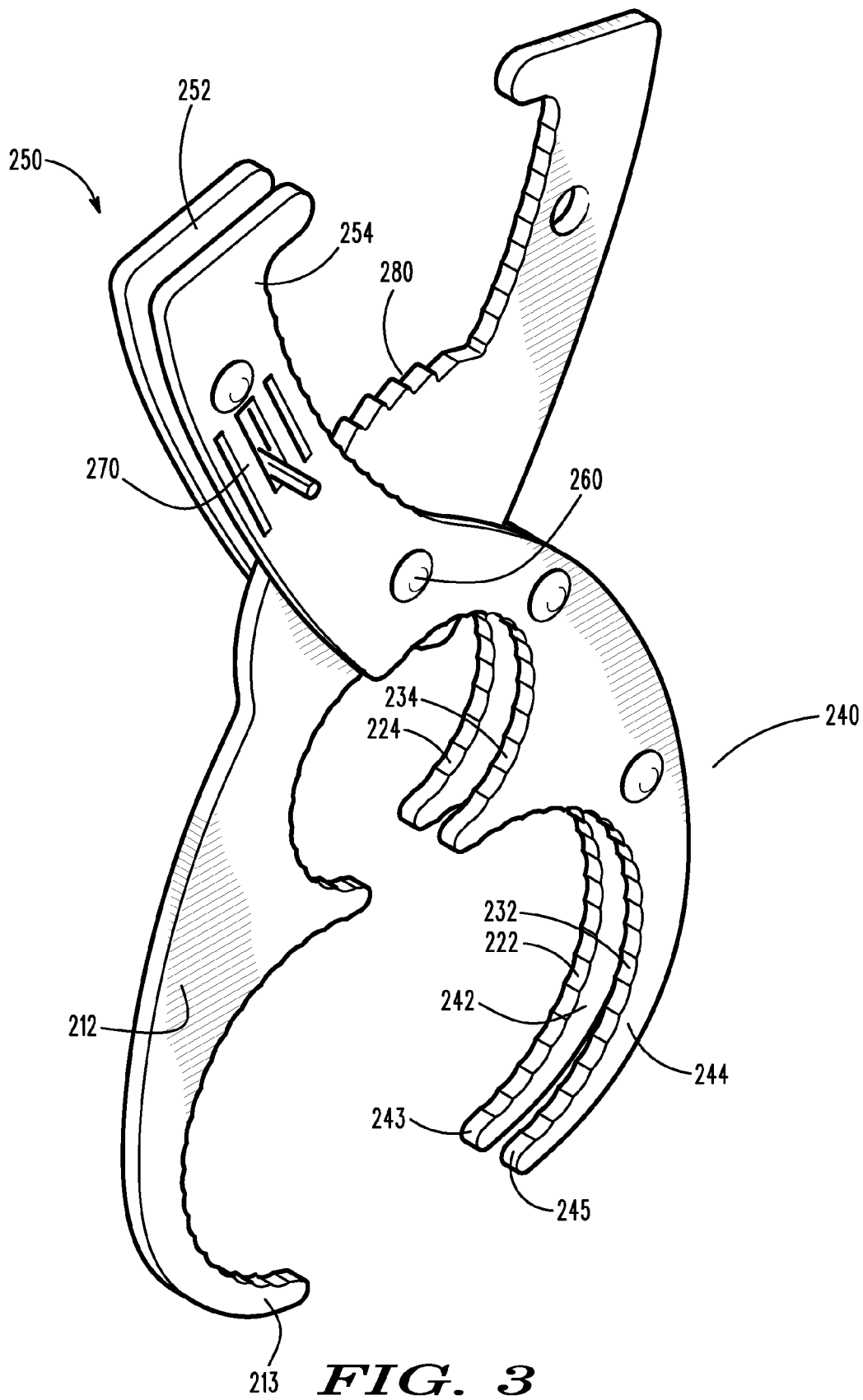
FIG. 3 is an isometric, bottom-up view of an open three sleeve holding apparatus, in accordance with various implementations.

FIG. 3 is an isometric view 300 of holding apparatus 200 from a different perspective in an open position in which the interior receiving surfaces 222, 232, 224, 234 and adjustable sizing element 280 are more readily seen.

Referring now to FIGS. 6 and 7, an example implementation of the quick release mechanism 270 as a finger pull quick release assembly is illustrated. In FIG. 6, an exploded view 600 of an example finger pull assembly 670 has finger pull shaft 674, lock sides 672, ratchet locking pin 676, spring 678, and bottom plate 679. FIG. 7 illustrates assembled finger pull assembly 670. It can be seen that the finger pull assembly 670 is coupled to handle 250 as shown and may be easily activated by one or more fingers of a user's hand. Adjustable sizing element 680 in this example comprises a number of ratchet teeth on handle 216, shown as a ratchet tooth arc, with which the ratchet locking pin 676 if not actuated engages as the handle is rotated about the axis of rotation 290 towards the closed position of the holding apparatus. The ratchet arc only needs four to five teeth to be able to hold hoses and tools. Locking pin holds the ratcheted tooth assembly of 680 in a stable position. Finger pull shaft 674 or slide is used as a ratchet mechanism and can be closed down to where the spacing between arms is relatively small, ¾ of an inch in width in some embodiments. The arms can be opened to accept the desired size object; for example, the arms can be opened to at least four inches to accept any two and one-half inch or smaller diameter hose. It is further understood that when the quick release mechanism pin is not releasably engaged with the adjustable sizing element 680, rotation about the axis of rotation is limited by a stop element of the adjustable sizing element 680.

Figure 8:
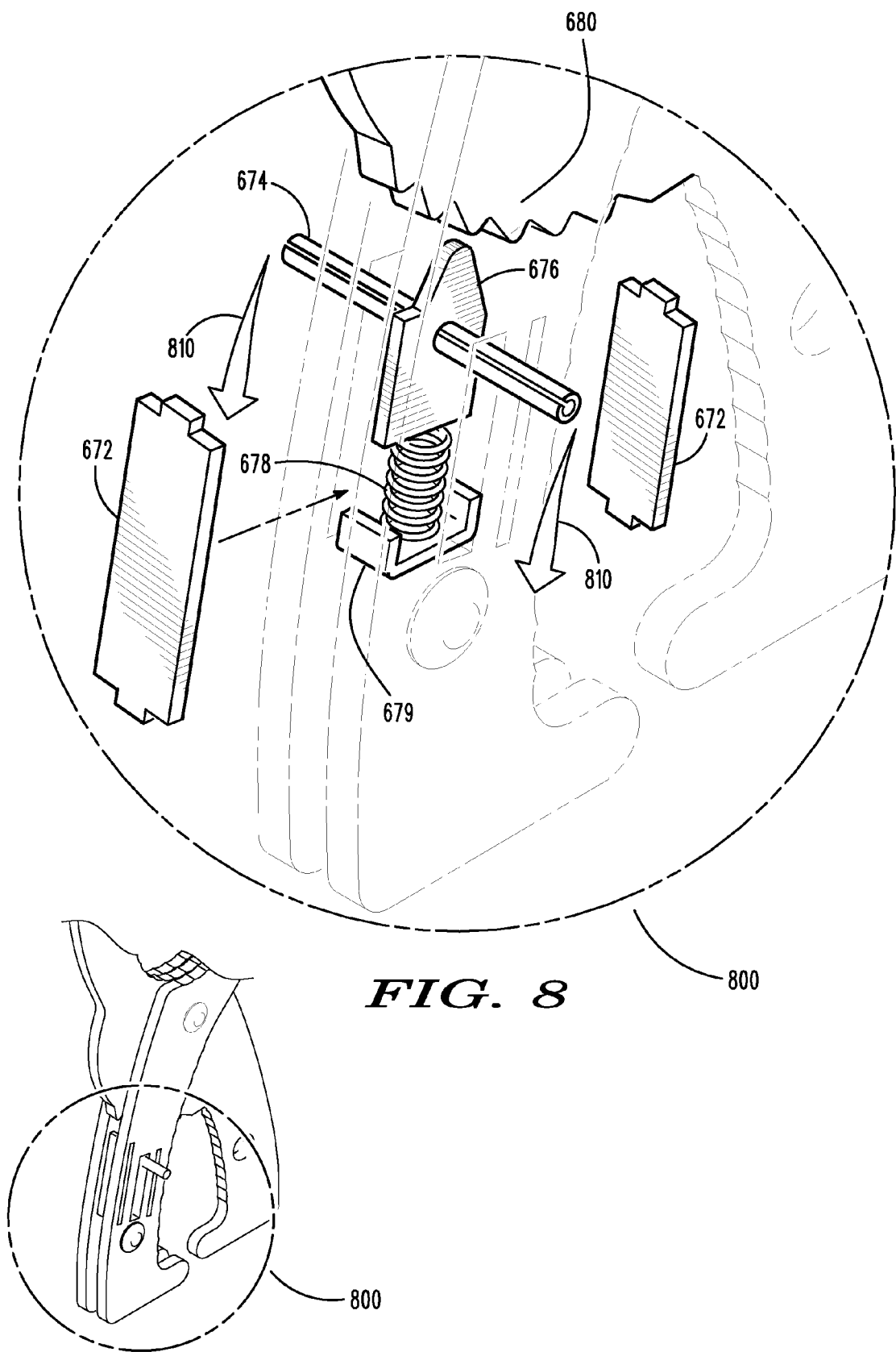
FIG. 8 is a view of a quick release mechanism of a holding apparatus in operation, in accordance with various implementations.

Finger pull shaft 674 is coupled to the ratchet locking pin 676 and is characterized as having a longitudinal axis transverse that of the ratchet locking pin 676 and is coupled to the ratchet locking pin. The finger pull shaft 674 passes through a surface of the ratchet locking pin 676 transverse the ratchet locking pin. Spring 678 is a biasing element coupled to the ratchet locking pin 676 that operates to exert a bias force that causes the ratchet locking pin 676 to make contact with ratchet teeth located on the handle 216 of the holding apparatus. When sufficient force is exerted to pull the finger pull shaft in a direction in opposition to the bias force exerted by the spring 678, the ratchet locking pin 676 no longer make contact with the ratchet teeth and releases the inner sleeve 210 to rotate about the axis of rotation 290. In FIG. 8, a view 800 of this action is illustrated, in which the sufficient downward pressure 810 on the finger pull shaft 674 releases engagement between the quick release mechanism 670 and adjustable sizing element 680. Locking pin 676 may be an aluminum slide pin, for example.

As has been mentioned, the quick release mechanism may alternately be a trigger assembly as shown in view 900 of FIGS. 9A and 9B, respectively. In FIG. 9A, holding apparatus 900 is formed of an interior sleeve with an arm 910 and handle 940 to which the trigger quick release mechanism 950 is attached, as well as a second sleeve with an arm 920 and handle 930. It is noted that in instances in which the three sleeve arrangement is employed, the second sleeve would be formed of two sleeves in parallel and arm 920 would be formed of two arm portions and handle 930 would be formed of two parallel arranged handle portions; such is illustrated in FIGS. 2-8, for example. Trigger quick release mechanism 950 is operable to engage with adjustable sizing structure 960 when the trigger is not activated. Trigger 950 in this example is formed by a spring 962 engaged as shown with trigger pull 968 and secured by bolt 966 and plate 964, with the end of the spring under the nut and bolt as shown. The side view of trigger quick release mechanism 950 further illustrates this arrangement. The trigger quick release mechanism 950 is affixed to the handle 940 by bolt 966 through plate 964 as shown.

It can be seen that trigger quick release mechanism 950 is shaped and configured is order to be easily operated by the finger or thumb of a user. Quick release mechanism 950 is formed to be ergonomically compatible with a person's thumb, so that it can be easily found and used with bulky gloves and in a smoke-filled environment. It can be understood that sufficient activation of the trigger mechanism 968 in a direction in opposition to the spring bias force exerted by the spring 962 causes the plate 964 to no longer make contact with the ratchet mechanism 960 and releases the inner sleeve 910 to rotate about the axis of rotation 290 of the holding apparatus. It is further understood that when the quick release mechanism trigger 968 is not releasably engaged with the adjustable sizing element, rotation is limited by a stop element of the adjustable sizing element 960.

As has been described, the sleeves of the holding apparatus provide both an arm and a handle, and the holding apparatus may be formed of two sleeves, or three or more sleeves having an interleaved, overlapping relationship as has been described. A sleeve may be thus formed of a unitary piece of material, such as metal like aluminum, plastic, injection molded plastic, etc. Thus, for example, first and second sleeves 120, 130 may each be formed from a single piece of material, such as aluminum, plastic, injection molded plastic or the like, or the sleeves could be formed of multiple pieces of material, such as separate portions for the arm and handle portions, for example.

It is further envisioned that the arms of the holding apparatus may be generally flat, as illustrated in FIGS. 1-9, or they may be rounded in shape to better accommodate hoses and other objects while reducing friction on such objects. Referring now to FIGS. 10A-10D, several examples of a holding apparatus 1000 with generally rounded or tubular arms formed in this manner are shown. In FIG. 10B, rounded arms are formed of aluminum as shown in Section A-A. In FIG. 10C, rounded arms are formed of plastic as shown in Section B-B, such as hardened plastic. In FIG. 10D, rounded arms may be formed of aluminum with a plastic coating or, as a further example, copper wire within plastic tubing or coating, as shown in Section C-C. Plastic tubing over metal, or a rubber or plastic coating may be employed. Further, the receiving structure(s) may be dipped, resulting in a holding apparatus formed of single, metal sleeves coated in a desired softening material, preserving the mechanical integrity of the holding apparatus while protecting an object being held in the receiving structure. It is further envisioned that injection molded plastic may be used to form the arms of the holding apparatus.

Figure 11B:
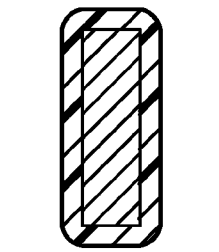
FIG. 11B illustrates a cross-sectional view of materials that may be used to form the tubular, rounded receiving arms of FIG. 11A, in accordance with various implementations.
Figure 11A:
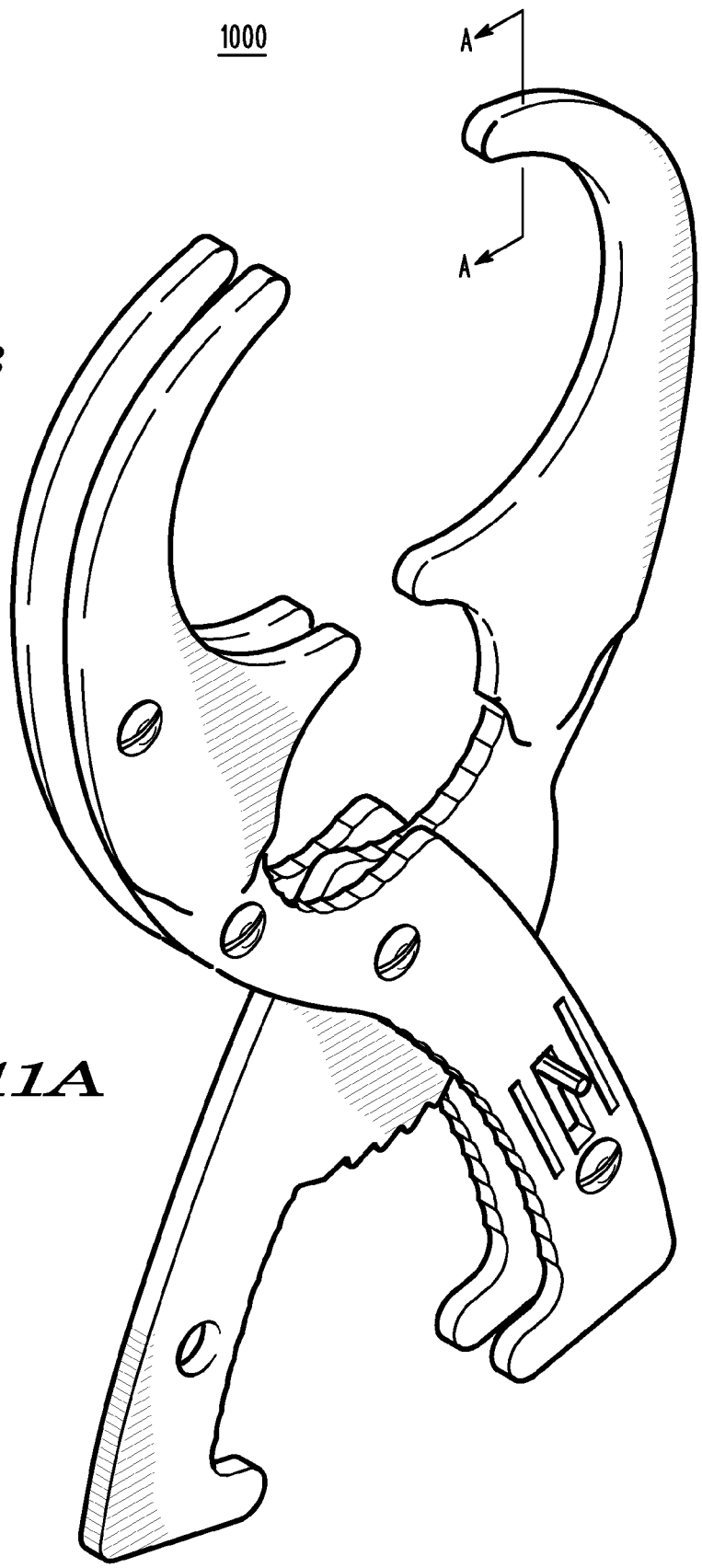
FIG. 11A illustrates a holding apparatus with two rounded interior receiving structures, in accordance with various implementations.

FIGS. 11A and 11B illustrate another example in which the arms of a holding apparatus 1000 may be coated in order to soften the edges of the arms. In FIG. 11B, Section A-A is aluminum coated with plastic, as a specific example. Rubber or other soft material may also be used.

Also with regard to FIG. 10A, rather than two pairs of interior receiving structures, as previously shown, a single receiving structure is shown. It is noted that a single receiving structure, instead of two, may foreshorten the length of the arms from the coupling point to the arm tips, resulting in a more compact holding apparatus that has a smaller overall length and is lighter.

An adjustable receiving structure may be formed of one pair of mated interior receiving surfaces 128, 138 that are in cooperative arrangement to form a single receiving structure, such as is shown in FIG. 10A, and may be represented by either 190 or 192, for example, or two receiving structures may be formed by two pairs of mated interior receiving surfaces 128, 138 as illustrated by 190 and 192 here. The surface of inwardly oriented receiving surfaces 128, 138 may be textured, such as slightly ribbed as shown, to enhance gripping ability of the adjustable receiving structure, though this is not required.

FIGS. 12-14 illustrate the ease of operation enjoyed with the holding apparatus described herein. The shoulder strap attached to the body over the shoulder and around the waist to incorporate the user's torso to support the weight of the objects held in the holding apparatus. The strap holds the claw at waist level or can be adjusted for the size of the user. The configuration of the strap on the user's body brings the weight of the object held closer to the centerline of the body and thus utilizes the larger muscles to support the weight of the object (s). In view 1200 of FIG. 12, it can be seen that a user, such as a member of the fire serve, enjoys one-handed operation of the holding apparatus 1210. Holding apparatus holds hose 1240 and is secured to a strap 1230, such as a shoulder and waist strap, worn by the user with a simple attachment 1220. It can be seen that the hose is being used (under pressure) with water or other liquid/gas flowing from its nozzle. In side view 1300 of FIG. 13, the holding apparatus 1310 rests comfortably at the side of the user, attached at attachment point 1320 to a shoulder and waist strap or harness 1330. This arrangement additionally includes the use of a self-contained breathing apparatus 1340, or SCBA, attached to the strap or harness. In side view 1400 of FIG. 14, the user is not using a SCBA. The attachment of the holding apparatus 1410 to the shoulder and waist strap/harness 1430 at attachment point 1420 can be readily seen.

From the foregoing, it can be understood and appreciated that a holding apparatus consistent with certain implementations has: a first sleeve having a first arm and a first handle of the holding apparatus; a second sleeve having a second arm and a second handle of the holding apparatus; a coupling element that couples together the first and second sleeves about an axis of rotation of the holding apparatus, with an overlap between the first and second arms of the holding apparatus formed upon sufficient rotation of at least the second sleeve about the axis of rotation towards a closed position of the holding apparatus; an adjustable receiving structure formed of inwardly oriented receiving surfaces of the first and second arms of the holding apparatus and configured to receive and retain an object upon sufficient rotation of at least the second sleeve about the axis of rotation towards the closed position of the holding apparatus; a quick release mechanism coupled to at least one of the first and second handles of the holding apparatus; and an adjustable sizing element coupled to the second handle of the holding apparatus configured to be in releasable engagement with the quick release mechanism to releasably maintain an adjustable size of the adjustable receiving structure, where activation of the quick release mechanism releases engagement of the adjustable sizing element with the quick release mechanism and allows at least the second handle and second arm to rotate about the axis of rotation.

Moreover, a holding apparatus consistent with certain other implementations presented herein has: first and second outer sleeves, with the first outer sleeve having a first outer handle portion and a first outer arm portion and the second outer sleeve having a second outer handle portion and a second outer arm portion, the first and second outer handle portions forming the first handle of the holding apparatus and the first and second outer arm portions forming the first arm of the holding apparatus; a first inner sleeve having a first inner handle portion and a first inner arm portion, with the first inner handle portion forming the second handle of the holding apparatus and the first inner arm portion forming the second arm of the holding apparatus; a coupling element that couples together the first inner sleeve to the first and second outer sleeves about the axis of rotation of the holding apparatus, with a spacing between the coupled first and second outer sleeves approximately a thickness of the first inner sleeve and sufficient to accommodate receipt of the second arm between the first and second outer arm portions of the first arm in an interleaved arrangement in which the first and second arms overlap when the first and second handles are sufficiently rotated towards each other about the axis of rotation; an adjustable receiving structure formed of inwardly oriented receiving surfaces of the first and second arms of the holding apparatus and configured to receive and retain an object upon sufficient rotation of at least the second sleeve about the axis of rotation towards the closed position of the holding apparatus; a quick release mechanism coupled to at least one of the first and second handles of the holding apparatus; and an adjustable sizing element coupled to the second handle of the holding apparatus configured to be in releasable engagement with the quick release mechanism to releasably maintain an adjustable size of the adjustable receiving structure, where activation of the quick release mechanism releases engagement of the adjustable sizing element with the quick release mechanism and allows at least the second handle and second arm to rotate about the axis of rotation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A holding apparatus, comprising:
   a first sleeve having a first arm and a first handle of the holding apparatus;
   a second sleeve having a second arm and a second handle of the holding apparatus;
   a coupling element that couples together the first and second sleeves about an axis of rotation of the holding apparatus, with an overlap between the first and second arms of the holding apparatus formed upon sufficient rotation of at least the second sleeve about the axis of rotation towards a closed position of the holding apparatus;
   an adjustable receiving structure formed of inwardly oriented receiving surfaces of the first and second arms of the holding apparatus and configured to receive and retain an object upon sufficient rotation of at least the second sleeve about the axis of rotation towards the closed position of the holding apparatus;
   a quick release mechanism coupled to at least one of the first and second handles of the holding apparatus; and
   an adjustable sizing element coupled to the second handle of the holding apparatus configured to be in releasable engagement with the quick release mechanism to releasably maintain an adjustable size of the adjustable receiving structure, where activation of the quick release mechanism releases engagement of the adjustable sizing element with the quick release mechanism and allows at least the second handle and second arm to rotate about the axis of rotation,
   the first sleeve further comprising:
     first and second outer sleeves, with the first outer sleeve having a first outer handle portion and a first outer arm portion and the second outer sleeve having a second outer handle portion and a second outer arm portion, the first and second outer handle portions forming the first handle of the holding apparatus and the first and second outer arm portions forming the first arm of the holding apparatus;
   the second sleeve further comprising:
     a first inner sleeve having a first inner handle portion and a first inner arm portion, with the first inner handle portion forming the second handle of the holding apparatus and the first inner arm portion forming the second arm of the holding apparatus; and the coupling element further comprising:
the coupling element that couples together the first inner sleeve to the first and second outer sleeves about the axis of rotation of the holding apparatus, with a spacing between the coupled first and second outer sleeves approximately a thickness of the first inner sleeve and sufficient to accommodate receipt of the second arm between the first and second outer arm portions of the first arm in an interleaved arrangement in which the first and second arms overlap when the first and second handles are sufficiently rotated towards each other about the axis of rotation.

2. The holding apparatus of claim 1, wherein a first tip portion of the first arm and a second tip portion of the second arm overlap upon sufficient rotation of at least the second sleeve towards the closed position of the holding apparatus.

3. The holding apparatus of claim 1, wherein the first and second outer sleeves share a first orientation about the coupling element of the holding apparatus and the first inner sleeve has a second orientation about the coupling element of the holding apparatus that mirrors in reverse that of the first orientation.

4. The holding apparatus of claim 1, wherein receiving surfaces of the first and second arms are generally rounded.

5. The holding apparatus of claim 1, wherein the first and second arm portions of the first arm and the first inner arm portion of the second arm are generally rounded in shape.

6. The holding apparatus of claim 1, wherein the adjustable receiving structure is formed by a generally curved first interior receiving surface of the first arm and a generally curved second interior receiving surface of the second arm configured to releasably receive one or more objects.

7. The holding apparatus of claim 6, wherein sufficient rotation of the holding apparatus about the axis of rotation forms an intermediate overlap portion of the first and second generally curved adjustable receiving structures intermediate a longitudinal axis of the holding apparatus between a tip overlap portion and the axis of rotation.

8. The holding apparatus of claim 1, wherein the coupling element further comprises:
a handle attachment element that couples together the first and second outer handle portions to form the first handle; and
an arm attachment element that couples together the first and second outer arm portions to form the first arm of the holding apparatus.

9. The holding apparatus of claim 8, the coupling element further comprising a spacing element attached between the first and second outer arm portions by the arm attachment element, wherein the spacing element provides a spacing between the first and second outer arm portions of the first arm determined by the thickness of the spacing element.

10. The holding apparatus of claim 9, wherein the thickness of the spacing element is at least the thickness of the second arm of the holding apparatus to accommodate the interleaved arrangement of the second arm of the first inner sleeve between the first and second outer arm portions of the first arm of the holding apparatus.

11. The holding apparatus of claim 1, wherein the first and second outer sleeves and the first inner sleeve of the holding apparatus are coupled together at the coupling element of the holding apparatus, with the first outer handle portion, the second outer handle portion and the first inner handle portion being substantially below the coupling element and the first outer arm portion, the second outer arm portion and the first inner arm portion substantially above the coupling element.

12. The holding apparatus of claim 11, wherein the first and second outer sleeves share a first orientation with respect to the coupling element and the first inner sleeve has a second orientation with respect to the coupling element.

13. The holding apparatus of claim 1, wherein the holding apparatus further comprises an attachment element of the first inner handle portion of the second handle that permits attachment of the holding apparatus.

14. The holding apparatus of claim 1, wherein the first and second outer sleeves and the first inner sleeve of the holding apparatus are each further formed of a unitary piece of material.

15. The holding apparatus of claim 14, wherein the unitary piece of material is aluminum.

16. The holding apparatus of claim 1, wherein sufficient rotation of the at least second handle towards the closed position of the holding apparatus causes first and second outer tip portions of the first and second outer arm portions of the first arm to overlap a first inner tip portion of the first inner arm portion of the second arm and the first inner tip portion of the first inner arm to be interleaved within the first and second outer tip portions of the first arm.

17. The holding apparatus of claim 1, wherein sufficient rotation of the at least second handle towards the closed position of the holding apparatus causes first and second outer tab portions of the first and second outer handle portions of the first handle to overlap a first inner tab portion of the first inner handle portion of the second handle and the first inner tab portion of the second handle to be interleaved within the first and second outer tab portions of the first handle.

18. The holding apparatus of claim 1, wherein the quick release mechanism is configured for one-handed operation.

19. The holding apparatus of claim 1, wherein the quick release mechanism is a trigger assembly coupled to the first and second handles of the holding apparatus.

20. The holding apparatus of claim 19, wherein the trigger assembly is operated by a thumb of a user.

21. The holding apparatus of claim 19, wherein the trigger assembly comprises:
a ratchet mechanism coupled to the first handle of the holding apparatus
a trigger mechanism coupled to the second handle of the holding apparatus;
a plate coupled to the trigger mechanism;
a biasing element coupled to the trigger mechanism and the plate, wherein the biasing element is operational to exert a bias force that causes the plate to make contact with the ratchet mechanism coupled to the first handle of the holding apparatus,
wherein sufficient activation of the trigger mechanism in a direction in opposition to the bias force exerted by the biasing element causes the plate to no longer make contact with the ratchet mechanism and releases the first inner sleeve to rotate about the axis of rotation.

22. The holding apparatus of claim 21, wherein the ratchet mechanism is coupled to one of first and second outer handle portions of the first handle of the holding apparatus.

23. The holding apparatus of claim 1, wherein the quick release mechanism is a finger pull assembly coupled to the first handle of the holding apparatus and operable by one or more fingers of a user's hand.

24. The holding apparatus of claim 23, wherein the adjustable sizing element comprises a ratchet having a plurality of ratchet teeth on the second handle of the holding apparatus with which the quick release mechanism if not actuated engages as the at least second handle is rotated about the axis of rotation towards the closed position of the holding apparatus and wherein the finger pull assembly comprises:
- a ratchet locking pin;
- a finger pull shaft coupled to the ratchet locking pin and having a longitudinal axis transverse that of the ratchet locking pin and coupled to the ratchet locking pin;
- a biasing element coupled to the ratchet locking pin and operational to exert a bias force that causes the ratchet locking pin to make contact with ratchet teeth located on a first inner handle portion of the second handle of the holding apparatus,
- wherein sufficient force to pull the finger pull shaft in a direction in opposition to the bias force exerted by the biasing element causes the ratchet locking pin to no longer make contact with the ratchet teeth on the second handle of the holding apparatus and releases the second sleeve to rotate about the axis of rotation.

25. The holding apparatus of claim 24, wherein the finger pull shaft passes through a surface of the ratchet locking pin transverse the ratchet locking pin.

26. The holding apparatus of claim 1, wherein activation of the quick release mechanism releases engagement of the quick release mechanism with the adjustable sizing element and permits rotation of at least the second handle and second arm of the second sleeve about the axis of rotation towards an open position of the holding apparatus to increase the adjustable size of the adjustable receiving structure of the holding apparatus or towards a closed position of the holding apparatus to decrease the adjustable size of the adjustable receiving structure of the holding apparatus.

27. The holding apparatus of claim 26, wherein the adjustable sizing element comprises a ratchet having a plurality of ratchet teeth with which the quick release mechanism engages as the first handle is rotated about the axis of rotation towards the closed position of the holding apparatus.

28. The holding apparatus of claim 1, wherein the first and second arms of the holding apparatus are operable to releasably receive and retain a hose.

\* \* \* \* \*